US008346981B2

(12) United States Patent
Scaffidi, Jr.

(10) Patent No.: US 8,346,981 B2
(45) Date of Patent: Jan. 1, 2013

(54) CONNECTION OF PERIPHERALS TO OPERATING SYSTEMS

(75) Inventor: Salvatore Gregory Scaffidi, Jr., Harford, NY (US)

(73) Assignee: MCCI Corporation, Ithaca, MA (US)

( * ) Notice: Subject to any disclaimer, the term of this patent is extended or adjusted under 35 U.S.C. 154(b) by 465 days.

(21) Appl. No.: 11/494,169

(22) Filed: Jul. 27, 2006

(65) Prior Publication Data

US 2007/0055800 A1 Mar. 8, 2007

Related U.S. Application Data

(60) Provisional application No. 60/710,457, filed on Aug. 23, 2005.

(51) Int. Cl.
*G06F 3/00* (2006.01)
*B41F 1/00* (2006.01)
(52) U.S. Cl. .......................................... 710/8; 358/1.14
(58) Field of Classification Search ................ 710/8
See application file for complete search history.

(56) References Cited

U.S. PATENT DOCUMENTS

| 5,898,861 | A  | * | 4/1999  | Emerson et al. | 703/23  |
| 6,622,195 | B2 | * | 9/2003  | Osakada et al. | 710/316 |
| 6,647,452 | B1 | * | 11/2003 | Sonoda         | 710/305 |
| 6,735,720 | B1 | * | 5/2004  | Dunn et al.    | 714/43  |
| 7,082,598 | B1 | * | 7/2006  | Le et al.      | 717/127 |
| 2003/0095279 | A1 | * | 5/2003 | Kim          | 358/1.14 |
| 2004/0088449 | A1 | * | 5/2004 | Sakaki        | 710/15 |
| 2007/0271558 | A1 | * | 11/2007 | Lim et al.   | 717/174 |

FOREIGN PATENT DOCUMENTS

| JP | 02222159 A | 9/1990 |
| JP | 08335201 A | 12/1996 |
| JP | 09288637 A | 4/1997 |
| JP | 2000267824 A | 9/2000 |

OTHER PUBLICATIONS

Microsoft: "How plug and play works" [Online], Mar. 28, 2003, Retrieved from the Internet: URL: http://technet.microsoft.com/en-us/library/cc781092(WS.10,printer).aspx [retrieved on Jan. 14, 2011].*
PCT Notification of Transmittal of the International Search Report and the Written Opinion of the International Searching Authority, or the Declaration, International Applicaion No. PCT/US2006/031673, International Filing Date: Aug. 14, 2006, Date of Mailing: Jan. 24, 2007, 13 pgs.

(Continued)

*Primary Examiner* — Henry Tsai
*Assistant Examiner* — Titus Wong
(74) *Attorney, Agent, or Firm* — Cesari and McKenna, LLP

(57) ABSTRACT

An arrangement for installing function drivers that provide communication between computer applications and various peripheral devices employs a master driver that is loaded for each peripheral device. The master drivers receive notification of the connection of the respective peripheral devices and, in time, load the proper function drivers. Each function driver has (1) an interface part that communicates with an application and (2) a peripheral part that communicates with the peripheral device associated with that application. When a device is disconnected, the associated function driver is notified and, in response, the driver discontinues operations of its peripheral part and retains operation of its interface part.

13 Claims, 2 Drawing Sheets

OTHER PUBLICATIONS

"How Plug and Play Works," Microsoft TechNet [Online: http://technet2.microsoft.com/WindowsServer/en/library/8c5274be-2174-4205-83cd-08304633b5a31033.mspx?pf=true#w2k3tr_pnp_how_lbrc], Mar. 28, 2003, 12 pgs.

Fisher, Lee, "Win32 Application Support for Plug and Play," MicroSoft Corporation, Device I/O Technical Articles, [Online: http://msdn2.miscrosoft.com/en-us/library/ms810038(d=printer).aspx] Jan. 18, 1995, 11 pgs.

Gamma, et al., "Design Patters: Elements of Reusable Object-Oriented Software," Addison Wesley Longman, Inc., ISBN: 0 201 63361 2, 1995, pp. 273-282.

Scaffidi, United States Provisional Patent Application for a "Connection of Peripherals to Operating Systems" filed on Aug. 23, 2006, U.S. Appl. No. 60/710,457.

Moore, United STates Patent Application for a "Technique for Driver Installation" Filed on Jun. 27, 2002, U.S. Appl. No. 10/185,976.

* cited by examiner

CONNECTION OF PERIPHERALS TO OPERATING SYSTEMS

CROSS-REFERENCE TO RELATED APPLICATIONS

The present application claims the benefit of U.S. Provisional Patent Application Ser. No. 60/710,457, which was filed on Aug. 23, 2005, by Salvatore Gregory Scaffidi, Jr. for a CONNECTION OF PERIPHERALS TO OPERATING SYSTEMS and is hereby incorporated by reference.

United States Patent Application of Terrill M. Moore for a TECHNIQUE FOR DRIVER INSTALLATION, Ser. No. 10/185,976, assigned to the assignee of the present application and whose contents are incorporated herein by reference.

BACKGROUND OF THE INVENTION

1. Field of the Invention

This invention relates to virtual ports connecting peripheral devices to computers. More particularly, it relates to a device driver arrangement that retains a virtual serial port when a peripheral device is disconnected from the computer.

2. Background Information

In the past, and to some extent the present, peripheral devices have been connected to computers by way of hardware serial ports designated with "com port" numbers. The software applications that make use of these peripheral devices communicate with them by way of software devices drivers. These peripheral devices are termed "built in" because the system will not respond to the plugging or unplugging of the devices while system is operating.

More recently, "hot-pluggable" devices have been introduced by way of USB (Universal Serial Bus) hardware ports and "Plug-N-Play" software included with operating systems such as the Windows 2000™ and Windows XP™ systems marketed by Microsoft Corporation. When a hot-pluggable device is connected to the computer, the operating system kernel installs a device driver particular to that device. In this case the driver also functions as a virtual corn port that interacts with the user application as though it were a hardware corn port in a built in arrangement.

If the device is detached from the computer during computer operation, the computer causes the associated driver to remove itself and this removes the virtual corn port function provided by the driver. This may cause malfunction because some applications, require a corn port connection even if a corresponding device has been detached.

SUMMARY OF THE INVENTION

In essence the invention involves splitting the device driver into two parts. One of these, which may be termed the "com interface part," provides the "com" interface to the associated application; the other, which may be termed the "driver port," provides communication with peripheral device. These two parts communicate with each other and, to the user application that uses the driver they appear to be a typical device driver. The corn interface part performs additional functions, as do other software modules described herein.

When a peripheral device is plugged into a USB port, it is detected by the operating system, which communicates with the device to obtain information that is used in selecting a device driver for the device and loading the driver into the computer memory. The user application that communicates with the peripheral device is notified as before and communications between the application and the peripheral device pass through the driver. This procedure is common to computer operating systems.

However, the device driver provided by the present invention functions differently when a hot pluggable" peripheral device is unplugged during computer operation. Specifically, as before, the operating system senses the removal of the peripheral device. It then orders the device driver to remove itself. Prior to the invention, the device driver released its memory space and thus removed the corn port with which the application communicated. Unless the application was written or rewritten to cope with a corn port removal, a malfunction could result.

However, the device driver described herein responds by removing only the portion that communicates with the removed device. It does not release the memory space containing the corn port. Accordingly, the application can continue to communicate with the driver as though the peripheral device had not been unplugged. It will, of course, not reach the peripheral device itself and therefore will operate as though the device has malfunctioned. Alternatively, the driver can be configured to provide the application with responses that are more suitable for the particular application.

BRIEF DESCRIPTION OF THE DRAWINGS

The invention description below refers to the accompanying drawings, of which.

DETAILED DESCRIPTION OF AN ILLUSTRATIVE EMBODIMENT

The following description is directed specifically to Microsoft Corporation Operating Systems. These systems are well known to those who write software that interfaces with the operating system kernel. Except for those modules provided by the invention, the various software modules referred to herein have been published by Microsoft Corporation.

Figure 1:
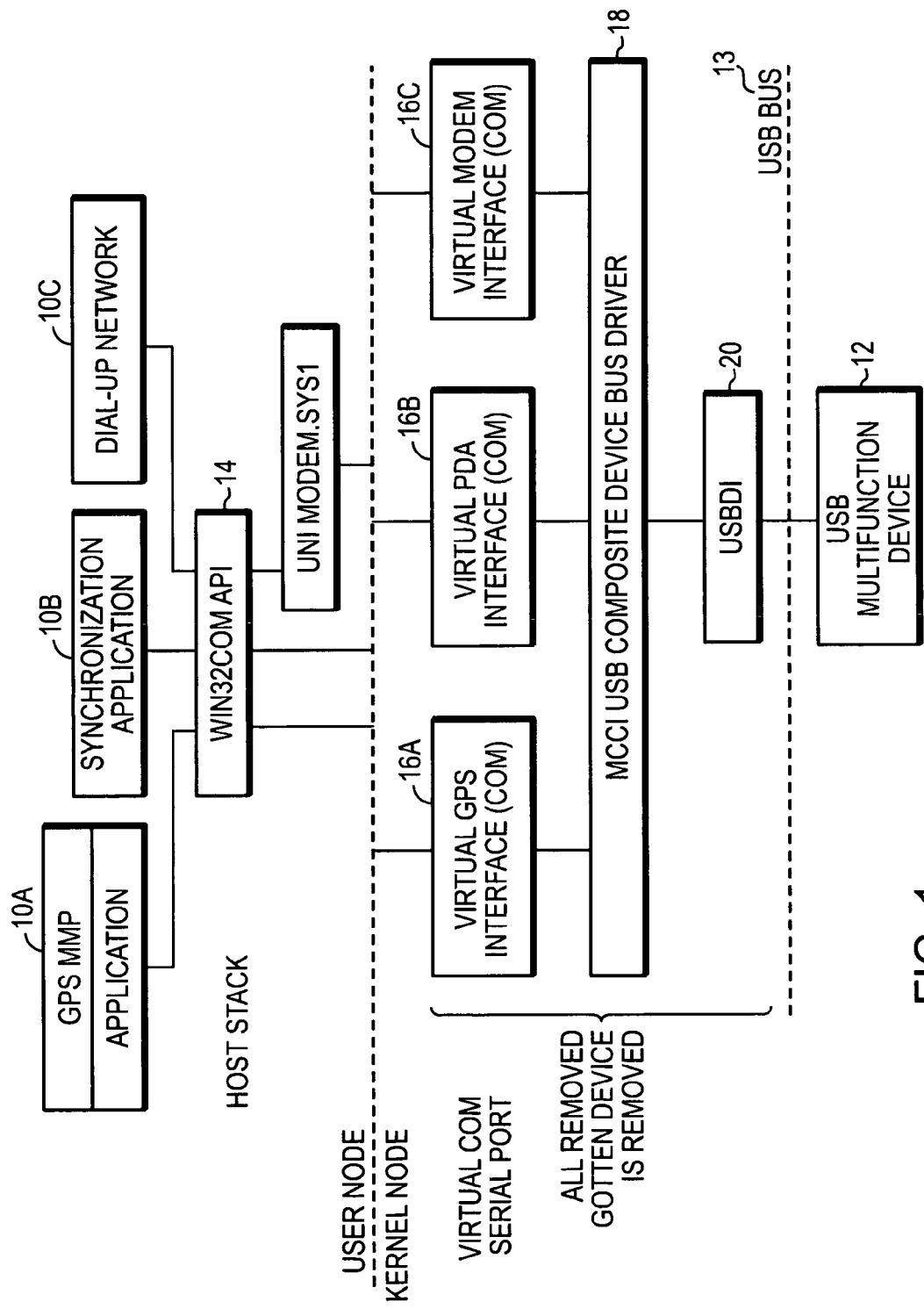
FIG. 1 is a block diagram of the software involved in a typical prior USB port arrangement.

FIG. 1 depicts a prior arrangement for communication between applications such as a GPS map application 10A, a synchronization application 10B, and a dial-up network utility 10C, on one hand, and a USB multifunction device 12 plugged into a peripheral USB bus 13. The GPS map application 10A communicates with a GPS receiver function of the device 12 to provide various map functions on the computer display. The synchronization application 10B is used to synchronize the data in a computer with a device (not shown), such as a personal digital assistant (PDA). A dial-up network utility 10C communicates with a modem function of the device 12.

The applications are interfaced with the operating system kernel (not shown) by a win32 corn API (application program interface) 14. The API 14, in turn, communicates with device drivers 16A, 16B, and 16C, which also function as virtual corn ports for the applications. The communication path is completed by a composite USB bus driver 18, which includes driver stacks (not shown) for incoming and outgoing data and, by a USB driver interface (USBDI) 20.

Alternatively, instead of using a single multifunction USB device, the peripheral arrangement may be configured with separate physical USB ports, with the devices that provide the respective functions being plugged into those ports.

When the system is turned on or restarted, the USBDI 20 checks the peripheral USB bus 13 for USB drivers. It interrogates the devices that it finds and identifiers them to the kernel. The kernel then loads the relevant device drivers (e.g., the drivers 16A, 16B, and 16C) into memory and provides the API 14 with the addresses of these drivers. The applications can then communicate with the respective peripheral functions Removal of the device 12 during computer operation is detected by the USBDI 20, which informs the kernel of the removal. The kernel then signals the device drivers 16A 16B and 16C to release their memory space, thereby removing the drivers. As discussed above, this may cause a computer malfunction.

Figure 2:
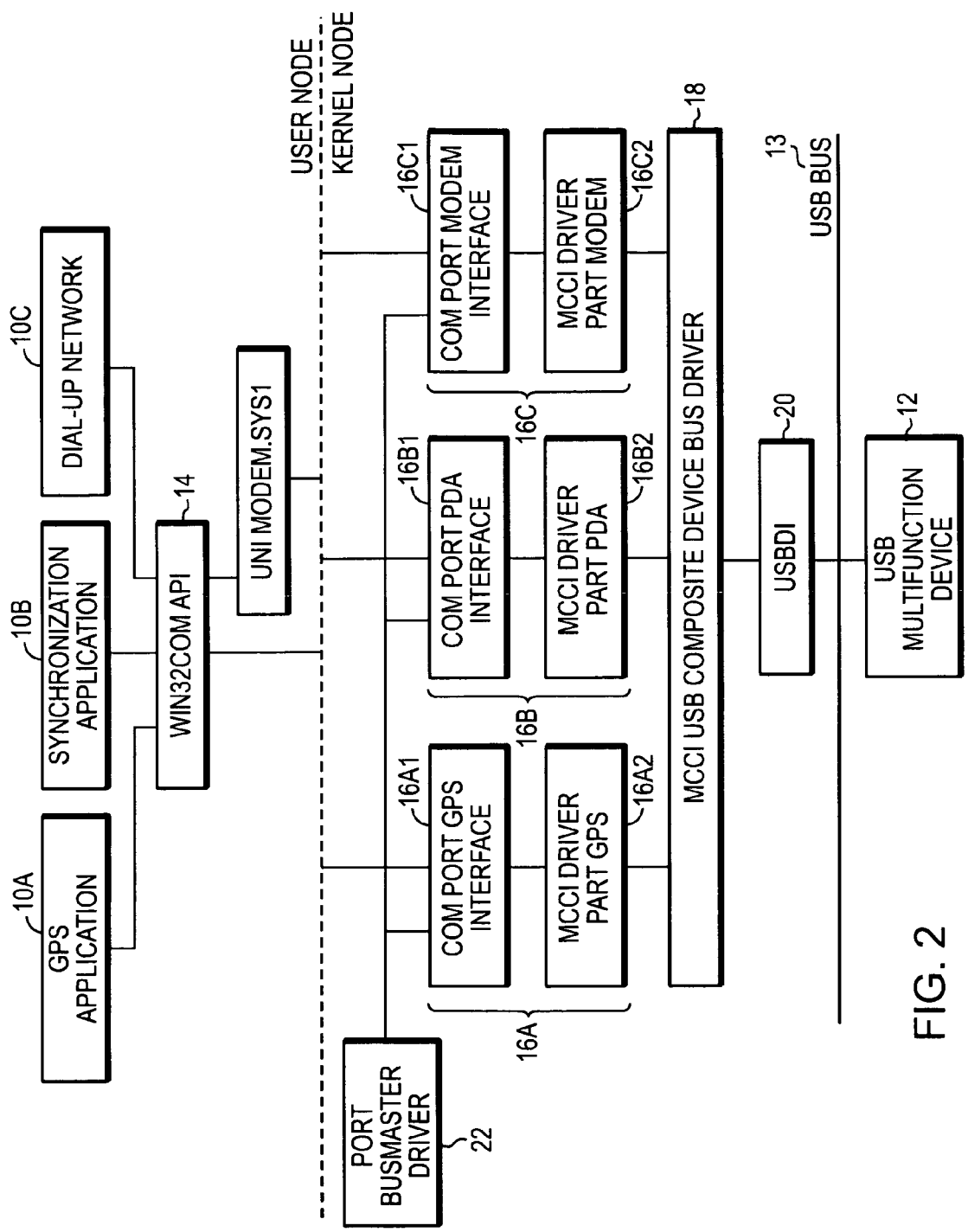
FIG. 2 is a block diagram of typical USB port arrangement incorporating the invention.

In FIG. 2, which depicts the invention, the various components provide the same functions as the like-numbered components of the system depicted in FIG. 1. However when the system is initialized, i.e. turned on or rebooted, a master driver 22 is also loaded into working memory. Specifically, as in prior arrangements, each peripheral device has an ID number that is retrieved by the system from the device when the latter is detected. This number is ordinarily used by the operating system to select and load into working memory the appropriate driver for that device. In the arrangement depicted in FIG. 2, a separate master driver is loaded on startup for each peripheral device that might be connected in accordance with the invention. Each master driver is loaded into memory on startup and it then registers with the kernel for connection notifications relating to the peripheral device having the ID with which that master driver is associated.

Accordingly, the master driver 22 registers for notifications relating to the peripheral device whose ID is that of the multifunction device 12. When the system starts up, and the device 12 is detected, the master driver 22 responds to the resulting notification by building the function drivers 16A, 16B and 16C. The function driver, in turn, registers with the kernel for notifications relating the connection or disconnection of the peripheral device 12.

In accordance with the invention, and as distinguished from the prior art, the functions of each function driver 16A, 16B and 16C have been effectively split into two modules. For example, 16A is split into: a com port interface part 16A1, that communications with an associated application (here a GPS application 10A) and serves as the com port for that application; and a driver part 16A2 that provides a link to a peripheral device (a peripheral function in a case of a multifunction peripheral device). As shown in FIG. 2, function driver 16B is split into 16B1 and 16B2 (for the PDA application 10B), and function 16C is similarly split into 16C1 and 16C2 (for a modem application). The function drivers (16A, 16B and 16C) register with the kernel for device-specific modifications as in the prior arrangements.

Preferably the function driver parts 16A1 and 16A2, 16B1 and 16B2, and 16C1 and 16C2 are physically configured as single blocks. Thus, the kernel loads the drivers (16A, 16B and 16C) into the working memory as is described above in connection with FIG. 1. However, if a peripheral device is unplugged and the kernel thereupon orders a driver to remove itself, the com port part 16A1, for example, responds by effectively disconnecting itself from the driver part 16A2. The application 10A that uses the function driver 16A will therefore continue to find the relevant com port in the application interface part 16A1. The application is thus not disturbed by the removal of the peripheral device. As mentioned above, the application will, of course, be unable to communicate with the peripheral device. However, the com port interface 16A1 provides appropriate responses to communications from the user application such as to avoid a malfunction that might otherwise occur in the absence of the requisite com port.

If a peripheral device that has been removed is plugged in again or otherwise replaced, the corresponding function driver 16, receives a notification of the event and, in response, reconnects itself to the previously disconnected driver part $16_2$ so that the corresponding application can communicate with the reconnected device.

Thus I have described a function driver arrangement for use with hot pluggable devices, which accommodates user applications that require access to corn ports even after the corresponding peripheral device has been unplugged. Specifically the invention retains in memory the portion of the function driver that provides the corn port interface to the application, thus preventing malfunctions that might result from removal of the corresponding corn ports.

What is claimed is:

1. A driver system for communication between a user application and a peripheral device, the driver system comprising:
   (A) a master driver for
      (1) receiving availability notifications relating to the peripheral device, and
      (2) installing a two-part function driver for the peripheral device,
   (B) the two-part function driver having
      an application interface part and a peripheral interface part, that communicate with each other to pass communications between the user application and the peripheral device,
      the application interface part communicating with the user application and providing a communication port interface for the user application; and
      the peripheral interface part communicating between the application interface part and the peripheral device,
   (C) the two-part function driver receiving notification of a removal of the peripheral device, and, in response,
      the application interface part disconnects from the peripheral interface part,
      the peripheral interface part discontinues communicating between the application interface part and the peripheral device, and
      the application interface continues to communicate with the user application to provide the user application with the communication port interface that responds to the communications from the user application without reaching the peripheral interface part of the two-part function driver to allow the user application to operate as if the removed peripheral device was still connected and malfunctioning since the user application cannot communicate with the peripheral device through the two-part function driver.

2. The driver system of claim 1 further comprising:
   a port bus master driver that builds and loads the application interface part and the peripheral interface part of the two-part function driver.

3. The driver system of claim 2 wherein the port bus master driver builds and loads the application interface part and the peripheral interface part of the two-part function driver at system start up.

4. The driver system of claim 1 further comprising:
   wherein when a previously disconnected peripheral device is re-plugged into the driver system, a notification is generated and sent to the application interface part to reconnect to the peripheral interface part, such that the user application can communicate with the re-plugged peripheral device.

5. A method of communicating between a user application and a peripheral device including:

providing communications between the user application and the peripheral device by utilizing a given function driver having an application interface part that operates together with a peripheral interface part, with the application interface part of the given function driver providing a communication port interface to the user application and the peripheral interface part communicating between the application interface part and the peripheral device;

on receipt of a notification that the peripheral device has been removed, disconnecting operations of the application interface part from those of the peripheral interface part of the given function driver and continuing operation of the application interface part with the user application to maintain the communication port interface for the user application, and discontinuing communication operations of the peripheral interface part between the application interface part of the given function driver and the peripheral device.

6. The method of claim 5 wherein the step of continuing operation of the application interface part includes responding to communications from the user application to establish that the communication port interface is still operable.

7. The method of claim 5 further including installing the given function driver for the peripheral device when the peripheral device is available.

8. The method of claim 7 wherein the step of installing occurs at system startup.

9. The method of claim 5 further including the user application continuing operations, utilizing the communication port interface maintained by the application interface part operating alone, and determining that the peripheral device is malfunctioning.

10. The method of claim 9 further including, on notification that the peripheral device is replaced, reconnecting the peripheral interface part to the application interface part of the given function driver to provide communications between the user application and the replaced peripheral device using the communication port.

11. The method of claim 10 further including the user application continuing operations, utilizing the reconnected application interface part and peripheral interface part of the given function driver, and determining that the replaced peripheral device is no longer malfunctioning.

12. The method of claim 10 wherein the replaced peripheral device is the peripheral device.

13. The method of claim 10 wherein the replaced peripheral device is a same type of peripheral device as the peripheral device.

* * * * *

UNITED STATES PATENT AND TRADEMARK OFFICE
CERTIFICATE OF CORRECTION

PATENT NO. : 8,346,981 B2
APPLICATION NO. : 11/494169
DATED : January 1, 2013
INVENTOR(S) : Salvatore Gregory Scaffidi, Jr.

It is certified that error appears in the above-identified patent and that said Letters Patent is hereby corrected as shown below:

In the Specification:

In col. 1, line 41 should read:
Case the driver also functions as a virtual ~~corn~~ com port that inter- In col. 1, line 43 should read:
~~Corn~~ com port in a built in arrangement.

In col. 1, line 46 should read:
Remove itself and this removes the virtual ~~corn~~ com port function In col. 1, line 48 should read:
Some applications, require a ~~corn~~ com port connection even if a In col. 1, line 60 should read:
Driver. The ~~corn~~ com interface part performs additional functions, In col. 2, line 10 should read:
Memory space and thus removed the ~~corn~~ com port with which the In col. 2, line 12 should read:
Ten or rewritten to cope with a ~~corn~~ com port removal, a malfunc- In col. 2, line 17 should read:
Taining the ~~corn~~ com port. Accordingly, the application can con- In col. 2, line 57 should read:
Kernel (not shown) by a win 32 ~~corn~~ com API (application program Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,346,981 B2

In col. 2, line 60 should read:
~~Corn~~ com ports for the applications. The communication path is In col. 3, line 2 should read:
Checks the peripheral USB bus 13 for USB ~~drivers~~ devices. It inter- In col. 3, line 3 should read:
Rogates the devices that it finds and ~~identifiers~~ identifies them to the In col. 3, line 43 should read:
That ~~communications~~ communicates with an associated application (here a In col. 3, line 52 should read:
~~Modifications~~ notifications as in the prior arrangements.

In col. 3, line 56 should read:
And 16C) into the working memory as ~~is~~ described above in In col. 4, line 12 should read:
Cations that require access to ~~corn~~ com ports even after the corre- In col. 4, line 15 should read:
Driver that provides the ~~corn~~ com port interface to the application, In col. 4, line 17 should read:
Of the corresponding ~~corn~~ com ports.